US011239719B2

(12) United States Patent
Natsumeda et al.

(10) Patent No.: US 11,239,719 B2
(45) Date of Patent: Feb. 1, 2022

(54) TRANSDUCER FOR CONVERTING BETWEEN ELECTRICAL ENERGY AND MECHANICAL ENERGY

(71) Applicant: Murata Manufacturing Co., Ltd., Nagaokakyo (JP)

(72) Inventors: Mitsutoshi Natsumeda, Nagaokakyo (JP); Hisato Amano, Nagaokakyo (JP); Takashi Sakurada, Nagaokakyo (JP); Eiji Sakaguchi, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 179 days.

(21) Appl. No.: 16/800,340

(22) Filed: Feb. 25, 2020

(65) Prior Publication Data

US 2020/0280232 A1  Sep. 3, 2020

(30) Foreign Application Priority Data

Feb. 28, 2019 (JP) .............................. JP2019-036203
Dec. 6, 2019 (JP) .............................. JP2019-221129

(51) Int. Cl.
| | | |
|---|---|---|
| *H02K 3/28* | (2006.01) | |
| *H02K 1/16* | (2006.01) | |
| *H02K 3/48* | (2006.01) | |
| *H02K 3/12* | (2006.01) | |

(52) U.S. Cl.
CPC ............... *H02K 3/28* (2013.01); *H02K 1/165* (2013.01); *H02K 3/12* (2013.01); *H02K 3/48* (2013.01)

(58) Field of Classification Search
CPC ............ H02K 3/28; H02K 3/12; H02K 1/165; H02K 2203/09
See application file for complete search history.

(56) References Cited

U.S. PATENT DOCUMENTS

| | | | |
|---|---|---|---|
| 2020/0280229 A1* | 9/2020 | Sakurada ................ | H02K 3/04 |
| 2020/0280232 A1* | 9/2020 | Natsumeda ............ | H02K 3/48 |
| 2020/0280235 A1* | 9/2020 | Natsumeda ............ | H02K 3/325 |
| 2020/0280236 A1* | 9/2020 | Natsumeda ............ | H02K 3/522 |
| 2020/0280775 A1* | 9/2020 | Natsumeda ............ | H02K 11/33 |

FOREIGN PATENT DOCUMENTS

JP          2016013053 A          1/2016

* cited by examiner

*Primary Examiner* — Robert W Horn
(74) *Attorney, Agent, or Firm* — Arent Fox LLP

(57) ABSTRACT

A motor that includes a plurality of stator members and a busbar member. A coil may be wound around each of the plurality of stator members, and the plurality of stator members may be arranged in an annular shape when viewed in an axial direction of the motor. The busbar member may connect to the coil ends of the plurality of stator members. The busbar member may comprise an annular shaped base portion, and a connection terminal connected to the base portion and connected to the coil end portions. The connection terminal may be provided with two recesses. The coil end portion of a first stator member and the coil end portion of a second stator member may be inserted through the two recesses respectively, where the first stator member and the second stator member are adjacent to each other.

15 Claims, 11 Drawing Sheets

TRANSDUCER FOR CONVERTING BETWEEN ELECTRICAL ENERGY AND MECHANICAL ENERGY

CROSS REFERENCE TO RELATED APPLICATIONS

This application claims priority to Japanese Patent Application No. 2019-036203, filed Feb. 28, 2019, and Japanese Patent Application No. 2019-221129, filed Dec. 6, 2019, the entire contents of each of which are hereby incorporated in their entirety.

TECHNICAL FIELD

Aspects of the present disclosure are directed to a transducer for converting between electrical energy and mechanical energy, for example, a motor to generate a rotational force by controlling the phase of a current flowing through a coil that is wound around a stator.

BACKGROUND OF THE INVENTION

Japanese Unexamined Patent Application Publication No. 2016-13053 discloses a motor. The motor disclosed in Japanese Unexamined Patent Application Publication No. 2016-13053 includes a stator core and a busbar. The stator core is made of a plurality of teeth, where a winding wire is wound around each tooth. The plurality of teeth are arranged at equal intervals in a circumferential direction.

The busbar is located close to the stator core in an axial direction of the motor. The busbar includes an annular-shaped base portion and a connection portion connected to the base portion. The connection portion projects, with respect to the base portion, from the opposite side to the side where the stator core is disposed. The connection portion has two flat plates facing each other.

When the winding wire of each of the teeth is connected to the busbar, an operator draws the winding wire to the outside and then inserts the winding wire between the two flat plates of the connection portion. Subsequently, the operator performs welding or the like at a position in which the winding wire is inserted and pinched between the two flat plates of the connection portion.

However, the structure of the motor disclosed in Japanese Unexamined Patent Application Publication No. 2016-13053, may not always be consistent, as the positional relationship between the winding wire of each of the teeth of the stator and the connection portion of the busbar may vary greatly.

For this reason, it is complex work by the operator to join the winding wire of the stator to the connection portion of the busbar consistently the same positional relationship.

SUMMARY OF THE INVENTION

Accordingly, it is an object of the present invention to provide a transducer for converting between electrical energy and mechanical energy having a structure in which a coil of a stator and a busbar are easily and consistently connected.

A transducer for converting between electrical energy and mechanical energy according to an aspect of the present disclosure includes a plurality of coils, a plurality of stators, and a busbar. Each of the plurality of may include a first coil end portion and a second coil end portion. In the stators, the plurality of coils may be wound. The stators may arranged in a loop shape. The busbar may connect to the first coil end portion and to the second coil end portion. The first coil end portion on one of the coils and the second coil end portion of another of the coils may be arranged to be adjacent to each other in a direction along the annular shape, in which the one of the coils and the other of the coils are adjacent to each other.

The busbar may include a base portion formed in an annular shape and a connection terminal connected to the base portion and connected to the first and second coil end portions adjacent to each other. The connection terminal may include a first recess and a second recess. The first coil end portion and the second coil end portion adjacent to each other may be inserted through the first recess and the second recess, respectively.

In this configuration, the adjacent coil terminals are inserted through the recesses of the connection terminal of the busbar. Therefore, when the coil terminal and the connection terminal of the busbar are to be joined, the coil terminal does not need be drawn for wiring.

Additional advantages and novel features of the system of the present disclosure will be set forth in part in the description that follows, and in part will become more apparent to those skilled in the art upon examination of the following or upon learning by practice of the disclosure.

BRIEF DESCRIPTION OF THE DRAWINGS

In the descriptions that follow, like parts are marked throughout the specification and drawings with the same numerals, respectively. The drawings are not necessarily drawn to scale and certain drawings may be shown in exaggerated or generalized form in the interest of clarity and conciseness. The disclosure itself, however, as well as a preferred mode of use, further features and advances thereof, will be understood by reference to the following detailed description of illustrative implementations of the disclosure when read in conjunction with reference to the accompanying drawings, wherein.

DETAILED DESCRIPTION

Figure 1:
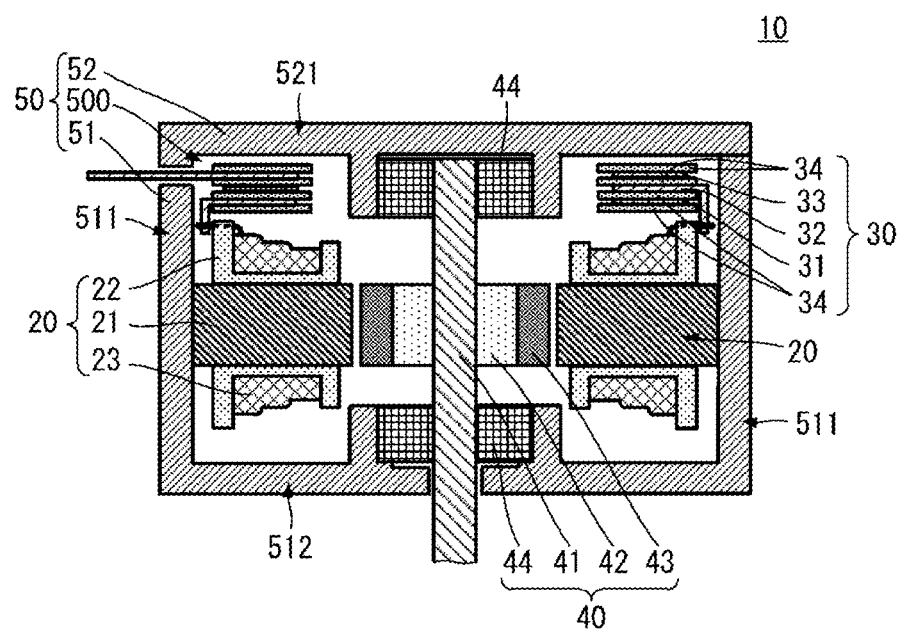
FIG. 1 is a cross-sectional view illustrating a schematic configuration of a motor in accordance with aspects of the present disclosure.
Figure 2:
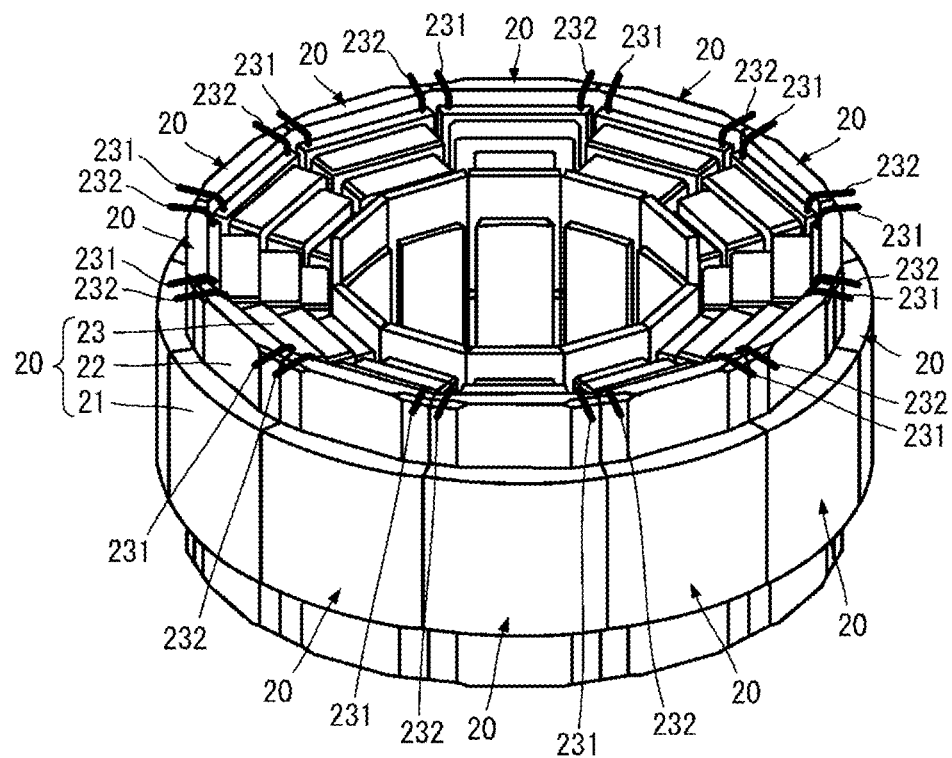
FIG. 2 is a perspective view illustrating an arrangement of a plurality of stator members in accordance with aspects of the present disclosure.
Figure 3A:
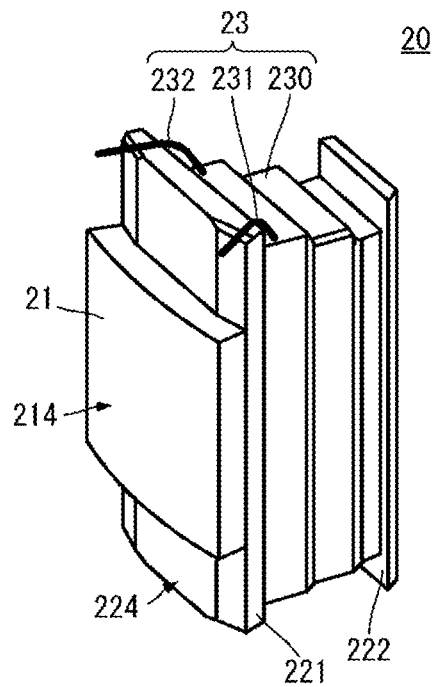
FIG. 3A is a perspective view of a stator member in accordance with aspects of the present disclosure.
Figure 3B:
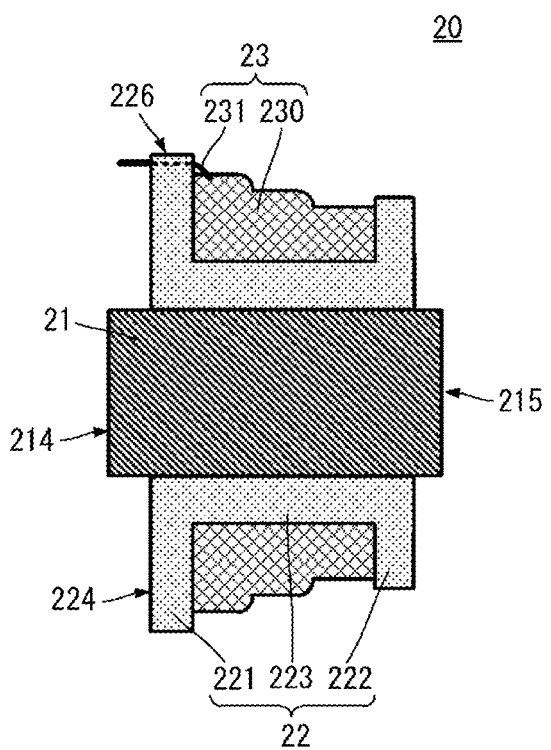
FIG. 3B is a cross-sectional view illustrating a schematic configuration of a stator member in accordance with aspects of the present disclosure.

A motor according to an aspect of the present invention will be described with reference to the drawings. FIG. 1 is a cross-sectional view illustrating a schematic configuration of a motor according to an aspect of the disclosure. FIG. 2 is a perspective view illustrating an arrangement of a plurality of stator members. FIG. 3A is a perspective view of a stator member, and FIG. 3B is a cross-sectional view illustrating a schematic configuration of a stator member. Although a motor is described as a transducer for converting between electrical energy and mechanical energy in one aspect of the disclosure, a generator may also be taken as the transducer. That is, the transducer for converting between electrical energy and mechanical energy may be any type of transducer that converts from electrical energy to mechanical energy and any type of transducer that converts from mechanical energy to electrical energy.

As illustrated in FIG. 1, a motor 10 includes stator members 20, a busbar member 30, a rotor member 40, and a housing 50. A plurality of stator members 20 (also referred to interchangeably herein as a "stator") are illustrated, yet any number of stator members may be implemented.

The housing 50 may include a first member 51 and a second member 52. The first member 51 has a cylindrical first wall 511 and a flat-plate second wall 512 sealing one end of the cylindrical shape. The first member 51 is formed in a substantially cylindrical box shape having an opening. The second member 52 is formed in a substantially plate-like shape. The second member 52 includes a flat-plate third wall 521. The second member 52 is disposed as to seal the opening of the first member 51. Thus, the housing 50 has a space 500 substantially blocked from an outside area via a combination of the first wall 511, the second wall 512, and the third wall 521. The material of the first member 51 and the second member 52 may be of a high rigidity.

The stator members 20, the busbar member 30, and the rotor member 40 may be disposed in the space 500 formed by the housing 50. The rotor member 40 may disposed substantially at the center in plain view of the third wall 521 and the second wall 512. For example, the rotor member 40 may be disposed in a central region of a predetermined size including a center axis of the substantially cylindrical shape formed by the first wall 511. In one aspect of the disclosure, an axial direction of the rotor member 40 may coincide, or parallel, with the axial direction of a substantially cylindrical shape formed by the plurality of stator members 20.

As illustrated in FIG. 1, the plurality of stator members 20 may be disposed between the cylindrical first wall 511 of the housing 50 and the rotor member 40. In one aspect of the disclosure, as illustrated in FIG. 2, the plurality of stator members 20 may be disposed at equal intervals along a circumferential direction of the cylindrical shape. The plurality of stator members 20 may be disposed close to one another.

As illustrated in FIG. 1, the busbar member 30 is disposed close to the plurality of stator members 20 in the axial direction of the housing 50. The busbar member 30 may be connected to the stator member 20 by a connection pattern, as described below. The busbar member 30 may be provided with a busbar output terminal. Part of the busbar output terminal may be exposed to an outside area of the housing 50.

Although not illustrated, it may be desirable to have an insulative resin between the plurality of stator members 20 and the wall 511. The thermal conductivity of the resin may be higher than that of air. As a result, heat dissipation performance of the motor 10 may be enhanced by the addition of the insulative resin. The insulative resin may be placed at a portion of the plurality of stator members 20 excluding the side facing the rotor member 40.

The rotor member 40 may include a shaft 41, a rotor yoke 42, a magnet 43, and a bearing 44. The shaft 41 may be rod-shaped and may be constructed with a high rigidity. The direction in which an axis of the shaft 41 extends (also referred to interchangeably herein as a "axial direction") coincides with an axis of the annular shape formed by the plurality of stator members 20. The shaft 41 may be installed in the housing 50 via the bearing 44. The rotor yoke 42 may be disposed on an outer circumferential surface of the shaft 41. The magnet 43 may be disposed on an outer circumferential surface of the rotor yoke 42.

The stator member 20 may include a stator core 21, an insulator 22, and a coil 23. As illustrated in FIGS. 3A and 3B, the stator core 21 is made of a magnetic material, and has a substantially columnar shape. The stator core 21 includes an outer end surface 214 and an inner end surface 215. The inner end surface 215 of the stator core 21 opposes the magnet 43.

The insulator 22 is electrically insulative and may include an outer member 221, an inner member 222, and a central member 223. The central member 223 has a substantially cylindrical shape. In one aspect of the disclosure, when viewed in the axial direction of the central member 223, an area of the outer member 221 and the inner member 222 may be larger than an area of the outer shape of the central member 223. The insulator 22 may be divided into two members comprising an upper member and a lower member (not labeled), and covers the stator core 21 by the upper member and the lower member. Thus, the central member 223 of the upper member and the central member 223 of the lower member may have a substantially semicircular cross section.

The central member 223 covers substantially the entirety of the outer circumferential surface of a central portion of the stator core 21. The outer member 221 may be disposed near an outer end portion of the stator core 21, and the inner member 222 may be disposed near an inner end portion of the stator core 21. With this configuration, the outer end surface 214 of the stator core 21 is not covered with the insulator 22, and the inner end surface 215 of the stator core 21 is not covered with the insulator 22.

The coil 23 may be made of a columnar-shaped linear conductor. The coil 23 may include a main conductor 230, a coil end portion 231, and a coil end portion 232. Both the coil end portion 231 and coil end portion 232 are also formed in a linear columnar shape. The coil end portion 231 is one end of the main conductor 230, and the coil end portion 232 is another end of the main conductor 230. The coil end portion 231 and the coil end portion 232 may also be referred to interchangeably herein as a "coil end portion."

The main conductor 230 may be covered with an insulative film. Neither the coil end portion 231 nor the coil end portion 232 are covered with the insulative film. The main conductor 230 may be wound around the central member 223 of the insulator 22. In one aspect of the disclosure, the main conductor 230 may be disposed within a region surrounded by an outer circumferential surface of the central member 223 in the insulator 22, a wall surface of the outer member 221 being on a side connecting to the central member 223 and not overlapping with the central member 223, and a wall surface of the inner member 222 on a side connecting to the central member 223 and not overlapping with the central member 223.

The coil end portion 231 and the coil end portion 232 are guided to an outside area of the stator member 20 from the outer member 221 side of the insulator 22. In one aspect of the disclosure, as illustrated in FIGS. 3A and 3B, the coil end portion 231 and the coil end portion 232 may be guided to the outside from one surface 226 of the outer member 221. The coil end portion 231 is guided from one end of the surface 226 in the outer member 221 to the outside, and the coil end portion 232 is guided from another end of the surface 226 in the outer member 221 to the outside. The "one end" and "another end" in the disclosure refers to the ends in a width direction of the stator member 20, and refer to the ends in a direction in which the plurality of stator members 20 are aligned (circumferential direction).

With this configuration, as illustrated in FIG. 2, in the stator members 20 adjacent to each other, the coil end portion 231 of one stator member 20 and the coil end portion 232 of another stator member 20 are close to each other along the alignment of the plurality of stator members 20. Herein, for example, the coil end portion 231 of the one stator member 20 corresponds to a "coil end portion of a first stator" of the present disclosure, and the coil end portion 232 of the other stator member 20 corresponds to a "coil end portion of a second stator" of the present disclosure.

Figure 4:
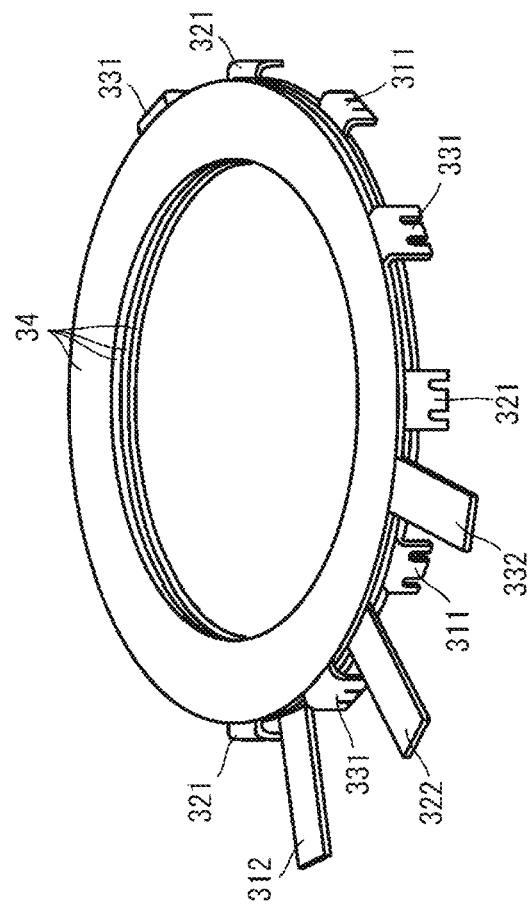
FIG. 4 is an external perspective view of a busbar member in accordance with aspects of the present disclosure.
Figure 5:
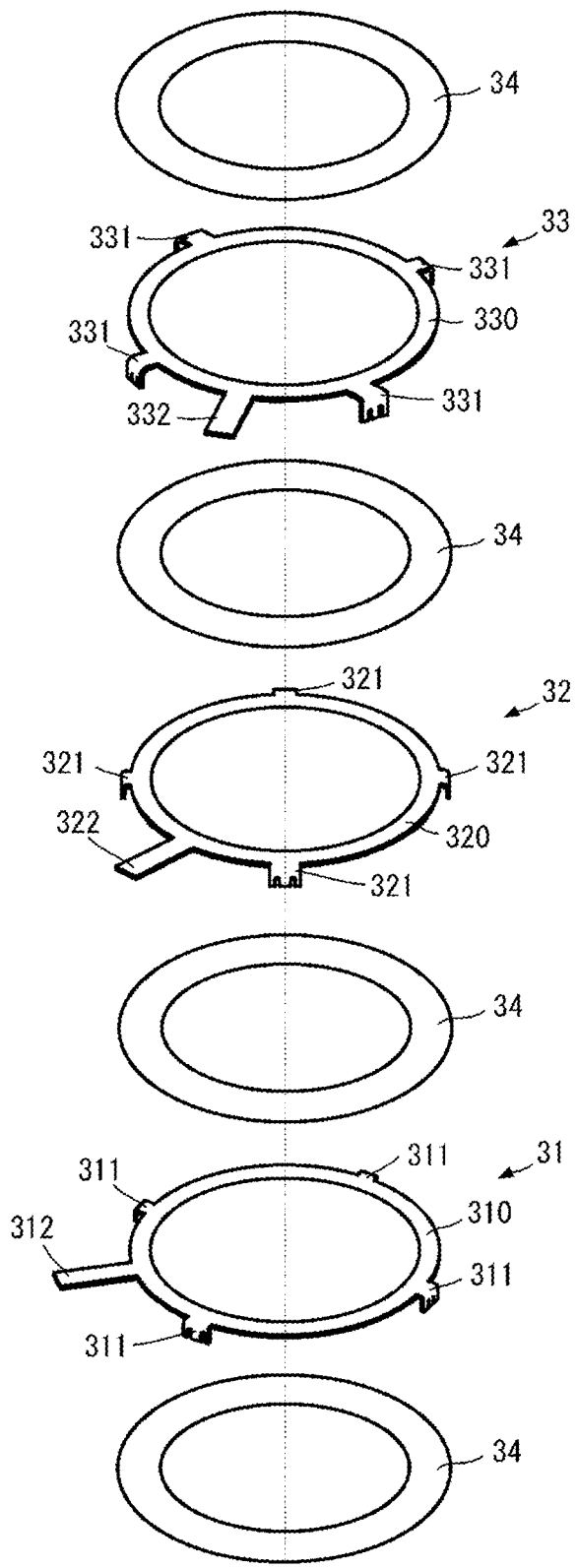
FIG. 5 is an exploded perspective view of a busbar member in accordance with aspects of the present disclosure.
Figure 6A:
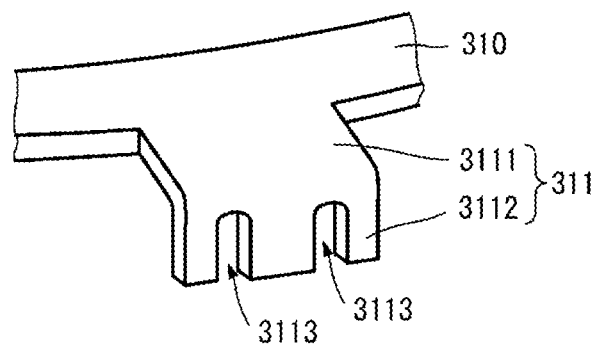
FIG. 6A is an enlarged perspective view of a busbar terminal in accordance with aspects of the present disclosure.
Figure 6B:
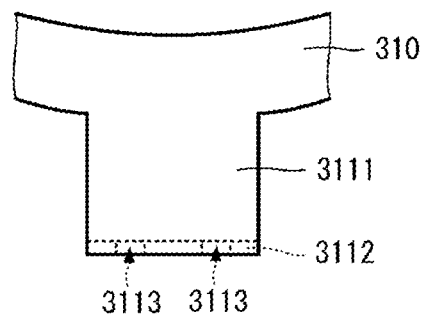
FIG. 6B is an enlarged plan view of a busbar terminal in accordance with aspects of the present disclosure.
Figure 6C:
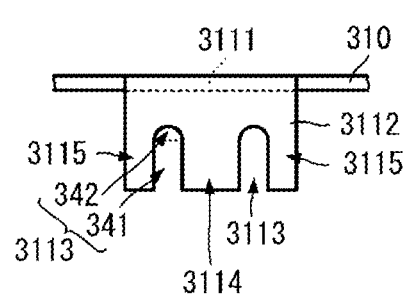
FIG. 6C is a first side view in which a busbar terminal is enlarged and depicted in accordance with aspects of the present disclosure.
Figure 6D:
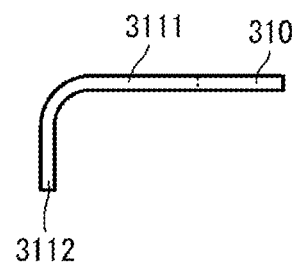
FIG. 6D is a second side view in which a busbar terminal is enlarged and depicted in accordance with aspects of the present disclosure.

FIG. 4 is an external perspective view of the busbar member according to an aspect of the disclosure. FIG. 5 is an exploded perspective view of the busbar member according to an aspect of the disclosure. FIG. 6A is an enlarged perspective view of a busbar terminal according to an aspect of the disclosure. FIG. 6B is an enlarged plan view of the busbar terminal. FIG. 6C is a first side view in which the busbar terminal is enlarged and depicted, and FIG. 6D is a second side view in which the busbar terminal is enlarged and depicted.

As illustrated in FIGS. 4 and 5, the busbar member 30 includes a busbar 31, a busbar 32, a busbar 33, and a plurality of insulating layers 34. The busbar 31, the busbar 32, and the busbar 33 are plate-shaped and electrically conductive. Since the busbar 31, the busbar 32, and the busbar 33 are plate-shaped, it is also possible to make these busbars thin and possible to flow a large size of current therethrough.

The busbar 31, the busbar 32, the busbar 33, and the plurality of insulating layers 34 may be laminated. For example, the order of the layers may be an insulating layer 34, a busbar 31, an insulating layer 34, a busbar 32, an insulating layer 34, a busbar 33, and an insulating layer 34. In one aspect of the disclosure, it may be possible to omit the insulating layers 34 located at both ends in the lamination direction as long as the insulative property is secured with respect to the housing 50 or the like.

The busbar 31 includes a base portion 310, a plurality of connection terminals 311, and an output terminal 312. The base portion 310 may be formed in an annular shape. The plurality of connection terminals 311 are arranged at equal intervals along the circumferential direction of the base portion 310. For example, as illustrated in FIGS. 4 and 5, the plurality of connection terminals 311 are arranged at an angular interval of approximately 90° along the circumferential direction. The plurality of connection terminals 311 are each formed in a shape projecting outward from the outer circumference of the base portion 310. The plurality of connection terminals 311 may have a width along the circumferential direction of the base portion 310. This width may correspond to a distance between the adjacent coil end portions 231 and 232 of the adjacent stator members 20, as described above. The output terminal 312 may be formed in a shape projecting outward from the outer circumference of the base portion 310. The output terminal 312 connects to a position different from the connection positions of the plurality of connection terminals 311 in the circumferential direction of the base portion 310.

The plurality of connection terminals 311 may be bent halfway in a lengthwise direction orthogonal to the width direction. In one aspect of the disclosure, as illustrated in FIGS. 6A, 6B, 6C, and 6D, the plurality of connection terminals 311 each include a first portion 3111 and a second portion 3112. The first portion 3111 is connected to the base portion 310. An end portion of the first portion 3111 on the opposite side to the connection end portion thereof to the base portion 310, is connected to the second portion 3112.

The first portion 3111 is substantially flush with the base portion 310. In one aspect of the disclosure, a main surface of the base portion 310 and a main surface of the first portion 3111 are connected to each other on the same plane. The second portion 3112 is orthogonal to the first portion 3111. For example, a main surface of the second portion 3112 and a circumferential surface of the first portion 3111 are substantially orthogonal to each other.

Bending directions of the plurality of connection terminals 311 are the same. For example, the second portions 3112 of the plurality of connection terminals 311 project in the same direction with respect to the base portion 310.

Two recesses 3113 may be formed in the second portion 3112 of the connection terminal 311. The two recesses 3113 are formed in a shape that is recessed from an end portion of the second portion 3112 toward the first portion 3111 side. For example, the end portion of the second portion 3112 is positioned on the opposite side to an end portion thereof connected to the first portion 3111 in the lengthwise direction.

The two recesses 3113 may be formed by being spaced from each other in a width direction of the second portion 3112. An interval between the two recesses 3113 may be substantially the same as an interval between the position of the coil end portion 231 of a first stator member 20 and the position of the coil end portion 232 of a second stator member 20 of the stator members 20 adjacent to each other.

The two recesses 3113 may each be provided with a main portion 341 and a leading end portion 342. One end in a depth direction of the main portion 341 may be opened to the outside at a tip of the second portion 3112. The other end in the depth direction of the main portion 341 may be connected to the leading end portion 342.

The main portion 341 has a rectangular shape in plan view of the second portion 3112. That is, the width of the overall main portion 341 in the depth direction is the same. The width of the main portion 341 is greater than or equal to the diameter of the coil end portion 231 and the coil end portion 232. The length of the main portion 341 may be larger than the width thereof, but the present disclosure is not limited thereto.

The leading end portion 342 has a substantially semicircular shape in plan view of the second portion 3112. For example, the trajectory of a wall surface forming the leading end portion 342 takes an arc shape in plan view of the second portion 3112. A distance between the center in the width direction of the second portion 3112 at the leading end portion 342 and the tip of the second portion 3112 is longer than a distance between both ends in the width direction of the second portion 3112 at the leading end portion 342 and the tip of the second portion 3112. The diameter of the substantially semi-circular shape formed by the leading end portion 342 is substantially the same as the diameter of the coil end portion 231 and the coil end portion 232.

The busbar 32 may include a base portion 320, a plurality of connection terminals 321, and an output terminal 322. The busbar 32 may have the same structure as that of the busbar 31. Specifically, the base portion 320 of the busbar 32 may be the same as the base portion 310 of the busbar 31. The plurality of connection terminals 321 of the busbar 32 may be the same as the plurality of connection terminals 311 of the busbar 31. In one aspect of the disclosure, however, a portion, extending in a direction orthogonal to the base portion 320, of each of the plurality of connection terminals 321 is longer than a portion, extending in a direction orthogonal to the base portion 310, of each of the plurality of connection terminals 311. The output terminal 322 of the busbar 32 may be the same as the output terminal 312 of the busbar 31.

The busbar 33 may include a base portion 330, a plurality of connection terminals 331, and an output terminal 332. The busbar 33 may have the same structure as that of the busbar 31. Specifically, the base portion 330 of the busbar 33 may be the same as the base portion 310 of the busbar 31. The plurality of connection terminals 331 of the busbar 33 may be the same as the plurality of the connection terminals 311 of the busbar 31. In one aspect of the disclosure, however, a portion, extending in a direction orthogonal to the base portion 330, of each of the plurality of connection terminals 331 is longer than the portion, extending in the direction orthogonal to the base portion 310, of each of the plurality of connection terminals 311, and longer than the portion, extending in the direction orthogonal to the base portion 320, of each of the plurality of connection terminals 321. The output terminal 332 of the busbar 33 is the same as the output terminal 312 of the busbar 31.

The base portion 310 of the busbar 31, the base portion 320 of the busbar 32, and the base portion 330 of the busbar 33 overlap one another when viewed in the lamination direction.

The connection terminals of the busbar 31, the busbar 32, and the busbar 33 do not overlap one another. More specifically, the connection terminals 311 of the busbar 31, the connection terminals 321 of the busbar 32, and the connection terminals 331 of the busbar 33 are arranged at equal intervals in the circumferential direction of the annulus where the base portion 310, the base portion 320, and the base portion 330 overlap one another. In this case, the connection terminal 311, the connection terminal 321 of the busbar 32, and the connection terminal 331 of the busbar 33 are arranged in sequence along the circumferential direction.

The insulating layer 34 has an annular shape. The insulating layer 34 may be made of an insulating paper. The insulating layer 34 is thinner than the busbar 31, the busbar 32, and the busbar 33. The insulating layers 34 are disposed, at least, between the base portion 310 of the busbar 31 and the base portion 320 of the busbar 32, and between the base portion 320 of the busbar 32 and the base portion 330 of the busbar 33. The insulating layers 34 may provide the busbar member 30 with insulative properties among the busbar 31, the busbar 32, and the busbar 33.

In FIGS. 4 and 5, the base portion 310, the base portion 320, and the base portion 330 are annular-shaped, but are not limited to annular shapes as long as they are circles. In the structure of FIGS. 4 and 5, no cut is present in the base portion 310, the base portion 320, and the base portion 330 in the circumferential direction, but there may be a cut therein.

Figure 7:
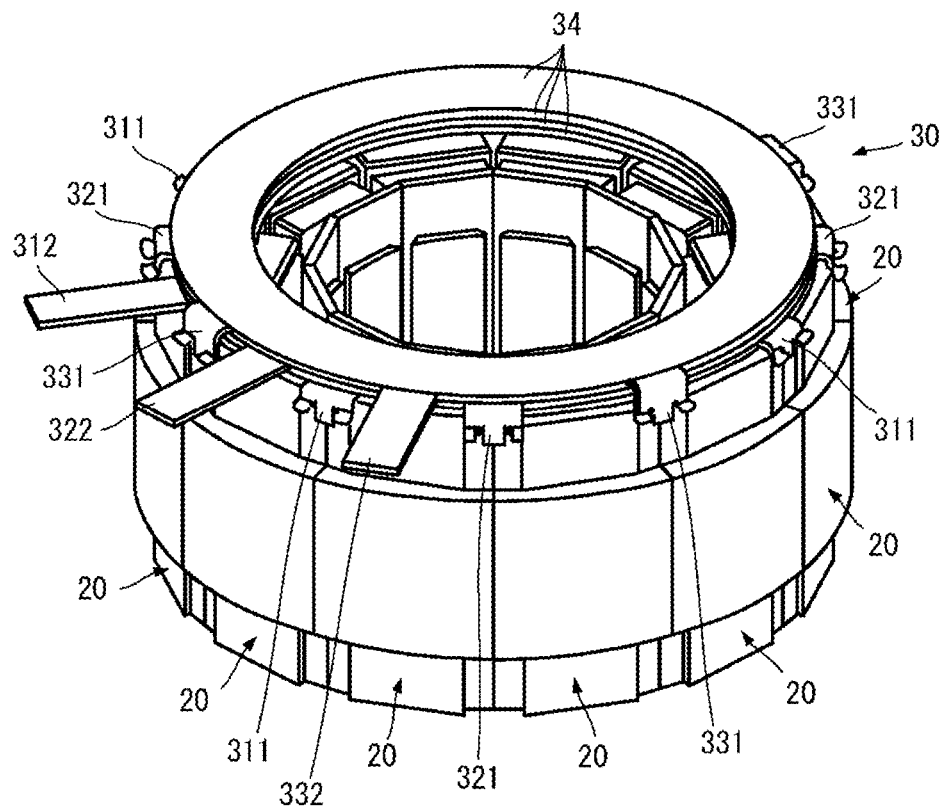
FIG. 7 is a perspective view illustrating a positional relationship between a plurality of stator members and a busbar member in accordance with aspects of the present disclosure.
Figure 8:
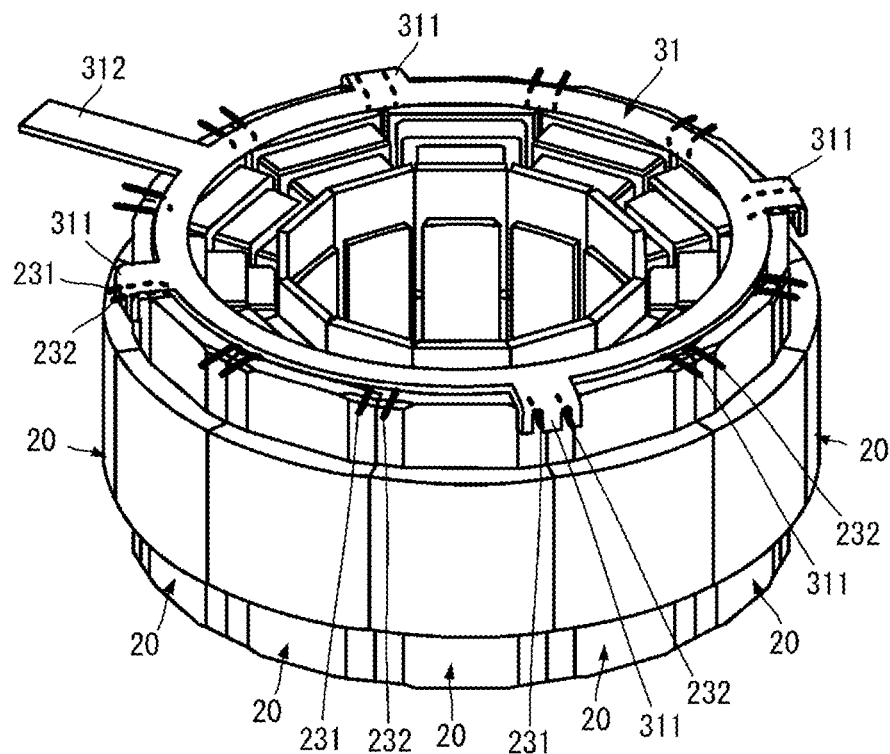
FIG. 8 is a perspective view illustrating a positional relationship between a plurality of stator members and one busbar in accordance with aspects of the present disclosure.
Figure 9:
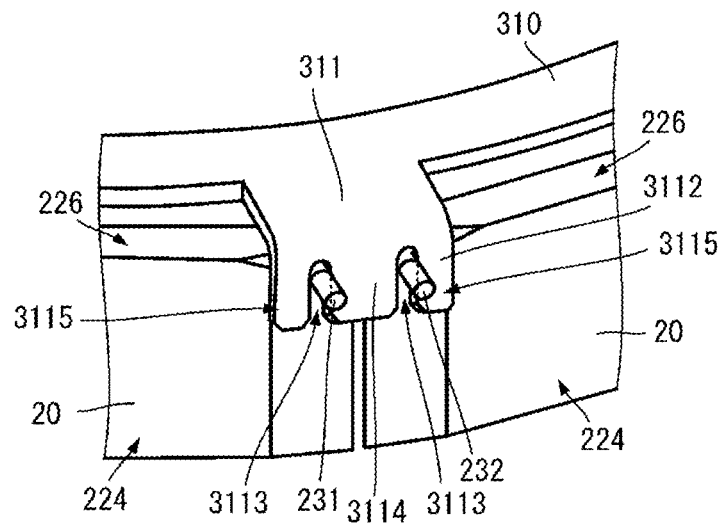
FIG. 9 is an enlarged view illustrating a positional relationship between stator members and one busbar in accordance with aspects of the present disclosure.

Positional Relationship Between Plurality of Stator Members 20 and Busbar Member 30 and Connection Structure FIG. 7 is a perspective view illustrating a positional relationship between the plurality of stator members and the busbar member according to an aspect of the disclosure. FIG. 8 is a perspective view illustrating a positional relationship between the plurality of stator members and one busbar according to an aspect of the disclosure. FIG. 9 is an enlarged view illustrating a positional relationship between the stator members and one busbar according to an aspect of the disclosure.

As illustrated in FIGS. 7 and 8, the busbar member 30 is disposed with respect to the plurality of stator members 20 such that the second portion 3112 of the connection terminal 311, the second portion of the connection terminal 321, and the second portion of the connection terminal 331 are located on the stator member 20 side. In one aspect of the disclosure, the connection terminal 311, the connection terminal 321, and the connection terminal 331 are each disposed in such a manner as to overlap an opposing portion of the adjacent stator members 20. Further, the connection terminal 311, the connection terminal 321, and the connection terminal 331 are disposed in such a manner as to oppose the outer end surface 214 of the insulator 22 of each of the plurality of stator members 20.

The coil end portion 231 and the coil end portion 232 of the adjacent stator members 20 may be inserted through two recesses 3113 of the connection terminal 311, two recesses 3113 of the connection terminal 321, or two recesses 3113 of the connection terminal 331. For example, as illustrated in FIG. 9, the coil end portion 231 and the coil end portion 232 of the adjacent stator members 20 may be inserted through the two recesses 3113 of the connection terminal 311. The recess 3113 through which the coil end portion 231 is inserted corresponds to a "first recess" of the present disclosure, and the recess 3113 through which the coil end portion 232 is inserted corresponds to a "second recess" of the present disclosure.

In one aspect of the disclosure, the interval between the coil end portion 231 and the coil end portion 232 may be substantially the same as the interval between the two recesses 3113. Thus, the coil end portion 231 and the coil end portion 232 of the adjacent stator members 20 may be easily inserted through the two recesses 3113 of the connection terminal 311.

Therefore, when the coil end portion 231 and the coil end portion 232 are to be joined to the connection terminal 331, the operator does not need to draw the coil end portion 231 and the coil end portion 232 to bring the coil end portion 231 and the coil end portion 232 close to the connection terminal 331. Therefore, the operator is able to easily join the coil 23 of the stator member 20 and the busbar member 30.

Further, the width of the recess 3113 may be larger than the diameter of the coil end portion 231 and the coil end portion 232. With this, when the busbar member 30 is attached to the plurality of stator members 20, the operator is able to easily insert the coil end portion 231 and the coil end portion 232 through the recesses 3113. Thus, the busbar member 30 may be arranged with respect to the plurality of stator members 20 in a state where the coil end portion 231 as well as the coil end portion 232 and the busbar member 30 can be easily joined to one another.

The depth of the main portion 341 of the recess 3113 is equal to or greater than the diameter of the coil end portion 231 and the coil end portion 232. With this, the coil end portion 231 and the coil end portion 232 are each accommodated in the recess 3113 without projecting from the opening at the tip side of the second portion 3112 to the outside of the recess 3113. Thus, the coil end portion 231 and the coil end portion 232 are hardly detached from the recesses 3113. This structure allows the join using a tongue portion 3315, which will be described later, to be easily carried out.

The leading end portion 342 of the recess 3113 may be semicircular. In one aspect of the disclosure, each coil end portion 231 and the coil end portion 232 make contact with the second portion 3112 along the circumferential direction of the coil end portion 231 and the coil end portion 232 at the leading end portion 342 of the recess 3113 (for example, at approximately half the circumference). The contact in this case is may be a total contact, but may be a partial contact due to a manufacturing tolerance or the like. With this, the coil end portion 231 and the coil end portion 232 are more reliably fixed in the recesses 3113.

Figure 10A:
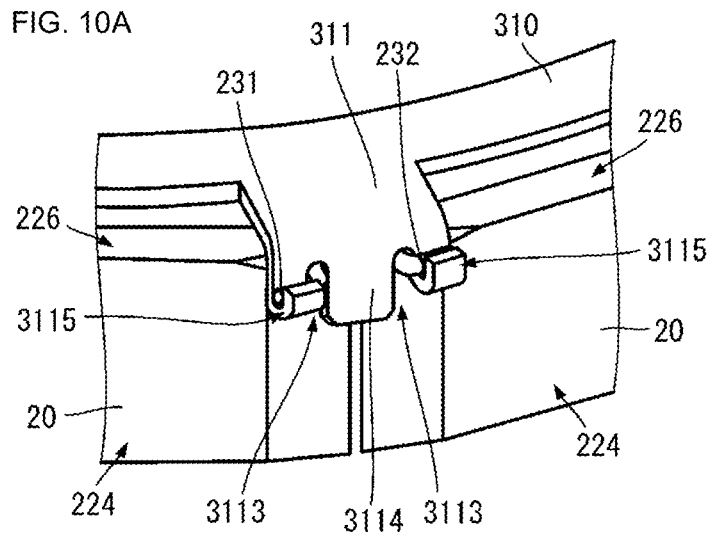
FIG. 10A is an enlarged view illustrating a connection aspect between a coil end portion and a connection terminal in accordance with aspects of the present disclosure.
Figure 10B:
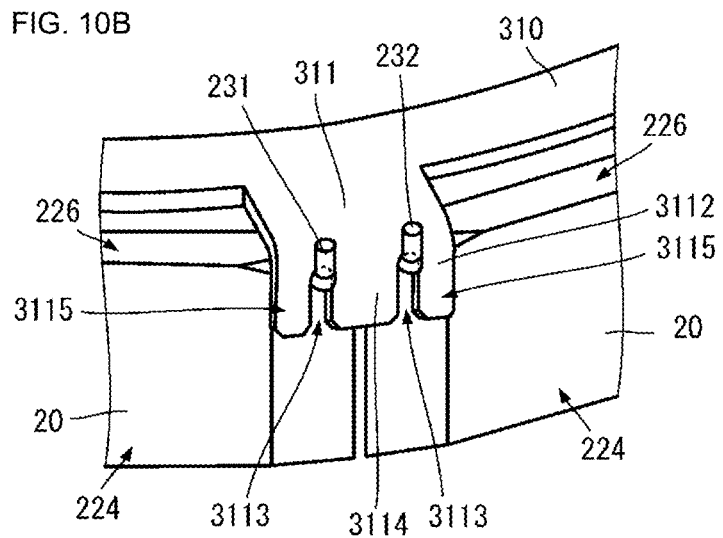
FIG. 10B is an enlarged view illustrating a connection aspect between a coil end portion and a connection terminal in accordance with aspects of the present disclosure.

FIGS. 10A and 10B are enlarged views each illustrating a connection aspect between a coil end portion and a connection terminal. The aspect illustrated in FIG. 10A is an aspect obtained by enlarging the connection aspect illustrated in FIG. 7. The aspect illustrated in FIG. 10B is an aspect depicting an example of another aspect from that of FIG. 10A. FIGS. 10A and 10B each illustrate the connection aspect between the coil end portion 231 as well as the coil end portion 232 and the busbar 31. However, a connection aspect between the coil end portion 231 as well as the coil end portion 232 and the busbar 32 or the busbar 33 may also be the same as that in the case of the busbar 31.

In the aspect illustrated in FIG. 10A and FIG. 7, the coil end portion 231 and the coil end portion 232 are bent in the width direction of the second portion 3112 from a thickness direction of the second portion 3112.

In one aspect of the disclosure, the coil end portion 231 is bent along an outer end surface 224 of the insulator 22 of the stator member 20 having the coil end portion 231 in a direction opposite to the side of the adjacent stator member 20. In one aspect of the disclosure, the coil end portion 232 is bent along the outer end surface 224 of the insulator 22 of the stator member 20 having the coil end portion 232 in a direction opposite to the side of the adjacent stator member 20.

Each bent portion of the coil end portion 231 and the coil end portion 232 may be provided at a portion where the recess 3113 opens to the main surface side of the second portion 3112.

In the aspect of FIG. 10A, the second portion 3112 is provided with one tongue portion 3114 and two tongue portions 3115, as illustrated in FIG. 10A and FIG. 9. The tongue portion 3114 may be arranged at the center in the width direction of the second portion 3112, and the two tongue portions 3115 are each arranged at the end in the width direction of the second portion 3112. The tongue portion 3114 and the tongue portion 3115 may be adjacent to each other, and are separated by the recess 3113.

One of the tongue portions 3115 may overlap with the coil end portion 231. The other one of the tongue portions 3115 may overlap with the coil end portion 232. The tongue portion 3115 overlapping with the coil end portion 231 corresponds to a "first tongue portion" of the present disclosure, and the tongue portion 3115 overlapping with the coil end portion 232 corresponds to a "second tongue portion" of the present disclosure.

One of the tongue portions 3115 may be bent to cover the outer circumference of the coil end portion 231 by making use of this bent structure. In one aspect of the disclosure, the tongue portion 3115 and the coil end portion 231 may be fixed by fusing, soldering, laser welding, or the like. Thus, the coil end portion 231 and the connection terminal 311 may be joined to each other.

One of the tongue portions 3115 may be bent to cover the outer circumference of the coil end portion 232 by making use of this bent structure. In one aspect of the disclosure, the tongue portion 3115 and the coil end portion 232 may be fixed by fusing, soldering, laser welding, or the like. Thus, the coil end portion 232 and the connection terminal 311 may be joined to each other.

In the aspect of FIG. 10B, as illustrated in FIG. 10B, the coil end portion 231 and the coil end portion 232 are bent in the lengthwise direction of the second portion 3112 of the connection terminal 311 and toward the first portion 3111 side. In one aspect of the disclosure, the coil end portion 231 as well as the coil end portion 232 and the second portion 3112 may be fixed by fusing, soldering, laser welding, or the like. Thus, the coil end portion 231 as well as the coil end portion 232 and the connection terminal 311 may be joined to one another.

As described above, the leading end portion 342 of the recess 3113 may have an arc-shaped wall surface. With this, each of the coil end portion 231 and the coil end portion 232 are bent while being abutted against the wall surface of the leading end portion 342. Thus, for example, the operator is able to easily and reliably bend the coil end portion 231 and the coil end portion 232 toward the first portion 3111 side.

Figure 11:
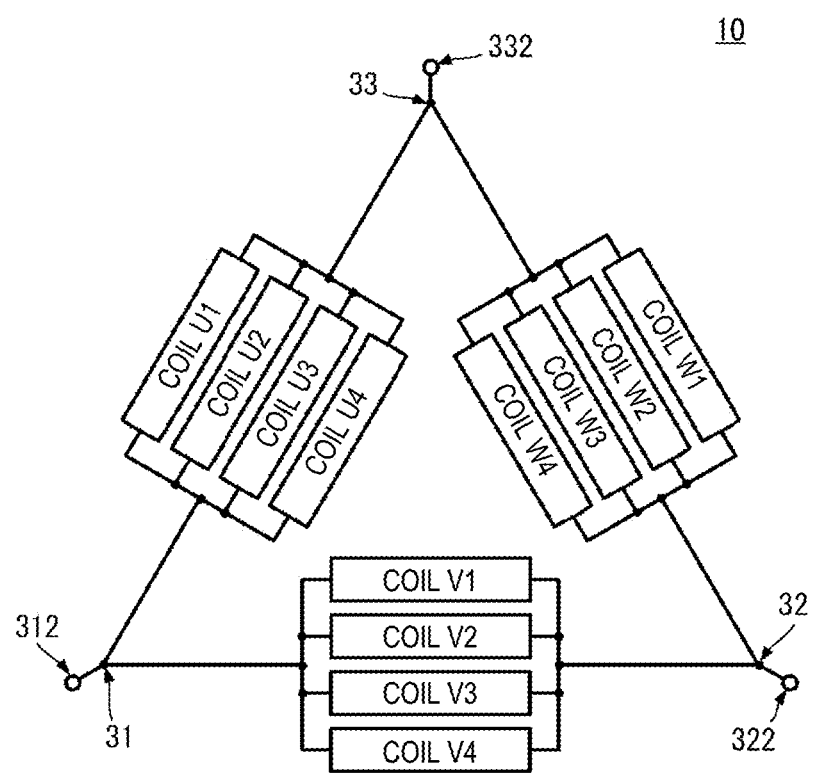
FIG. 11 is an equivalent circuit diagram of a motor in accordance with aspects of the present disclosure.

Regarding the structure, as described above, the motor 10 having a circuit configuration illustrated in FIG. 11 may be achieved. FIG. 11 is an equivalent circuit diagram of the motor according to an aspect of the disclosure.

As illustrated in FIG. 11, the motor 10 includes a U-phase coil, a V-phase coil, and a W-phase coil. The U-phase coil has a circuit configuration in which a coil U1, a coil U2, a coil U3, and a coil U4 are connected in parallel. The V-phase coil has a circuit configuration in which a coil V1, a coil V2, a coil V3, and a coil V4 are connected in parallel. The W-phase coil has a circuit configuration in which a coil W1, a coil W2, a coil W3, and a coil W4 are connected in parallel.

One end of the U-phase coil is connected to one end of the V-phase coil. Another end of the V-phase coil is connected to one end of the W-phase coil. Another end of the W-phase coil is connected to the other end of the U-phase coil. For example, the U-phase coil, the V-phase coil, and the W-phase coil are connected in the form of delta connection.

Each of the coils U1, U2, U3, U4, V1, V2, V3, V4, W1, W2, W3, and W4 may be implemented by the stator member 20, as described above. The connection portion connecting the U-phase coil and the V-phase coil may be implemented by, for example, the busbar 31 described above. The connection portion connecting the V-phase coil and the W-phase coil is implemented by, for example, the busbar 32 described above. The connection portion connecting the W-phase coil and the U-phase coil is implemented by, for example, the busbar 33 described above. Three output portions of the delta connection are implemented by the output terminal 312 of the busbar 31, the output terminal 322 of the busbar 32, and the output terminal 332 of the busbar 33.

In the above configuration, the connection terminal 311 of the busbar 31, the connection terminal 321 of the busbar 32, and the connection terminal 331 of the busbar 33 are bent toward the side of the plurality of stator members 20 in the axial direction, as described above. Further, the second portion 3112 of the connection terminal 311 of the busbar 31, the second portion of the connection terminal 321 of the busbar 32, and the second portion of the connection terminal 331 of the busbar 33 overlap the insulators 22 of the plurality of stator members 20 in the axial direction. In one aspect of the disclosure, the second portions of the connection terminal 311 of the busbar 31, the connection terminal 321 of the busbar 32, and the connection terminal 331 of the busbar 33 overlap with the insulators 22 of the plurality of stator members 20 when the motor 10 is viewed from the side (viewed from a direction orthogonal to the axial direction). At these second portions, the connection terminals are connected to the coil end portions 231 and the coil end portions 232 of the stator members 20.

Accordingly, the size of a portion in the axial direction of the motor 10 including the busbar member 30 and the plurality of stator members 20 may be the sum of the thickness of the laminated portion of the base portion 310 of the busbar 31, the base portion 320 of the busbar 32, the base portion 330 of the busbar 33, and the plurality of insulating layers 34 of the busbar member 30, and the size in the axial direction of the stator member 20. In one aspect of the disclosure, the size of the portion including the busbar member 30 and the plurality of stator members 20 in the axial direction of the motor 10 may not be affected by the sizes of the connection terminal 311, the connection terminal 321, and the connection terminal 331. Therefore, the shape of the portion including the busbar member 30 and the plurality of stator members 20 may be reduced. Thus, it is possible to reduce the size of the motor 10 without lowering the output thereof.

As illustrated in FIGS. 1, 7, and 8, each of the second portions of the connection terminal 311, the connection terminal 321, and the connection terminal 331 is disposed on the center axis side relative to the outer end surface 214 of the stator core 21. In one aspect of the disclosure, the dimension in the direction orthogonal to the axis is not increased. Accordingly, it is also possible to reduce the shape in the direction orthogonal to the axis of the motor 10 while maintaining the output thereof.

As an example, as illustrated in FIG. 9, each of the second portions of the connection terminal 311, the connection terminal 321, and the connection terminal 331, as illustrated and labeled in in FIG. 4, are in contact with the outer end surface 224 of the outer member 221 of the insulator 22. These contact portions may be used for positioning when the busbar member 30 is arranged with respect to the plurality of stator members 20. Thus, it may make it easy to assemble the motor 10.

Further, as described above, the recess may be formed in each of the second portions of the connection terminal 311, the connection terminal 321 and the connection terminal 331, and the coil end portion may be inserted through the recess. This facilitates the positioning and joining of the connection terminals 311, 321, and 331 with respect to the plurality of coil end portions. Accordingly, the assembly of the motor 10 is further facilitated.

Further, as illustrated in FIG. 10A, the plurality of coil end portions are fused in a state of being covered with the tongue portions 3115 of the second portions. Thus, the reliability of the joining between the coil end portion and the second portion may be enhanced. Furthermore, a jig for fusing does not directly contact with the coil end portion. Therefore, the film near the coil end portion is unlikely to be attached to the fusing jig. Because of this, the fusing process is easy to control, and the maintenance of the jig for fusing is facilitated.

In this case, the tongue portions 3115 may be formed by having two recesses 3113 through which the coil end portion 231 and the coil end portion 232 are inserted. Accordingly, the tongue portion 3115 may be formed without preparing a cut or the like for forming the tongue portion 3115 in the second portion 3112.

Figure 12A:
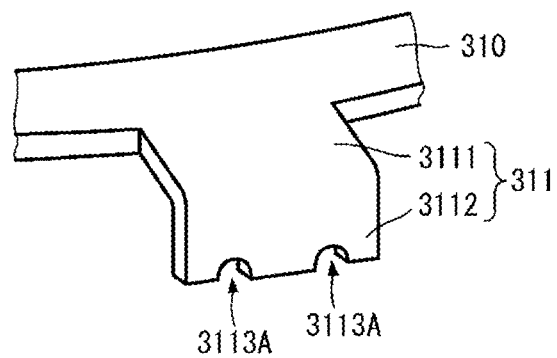
FIG. 12A is a perspective view illustrating a connection terminal in accordance with aspects of the present disclosure.
Figure 12B:
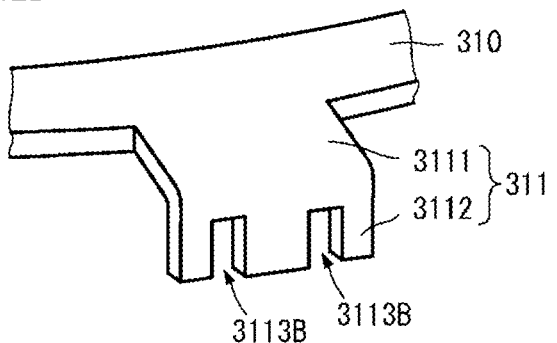
FIG. 12B is a perspective view illustrating a connection terminal in accordance with aspects of the present disclosure.
Figure 12C:
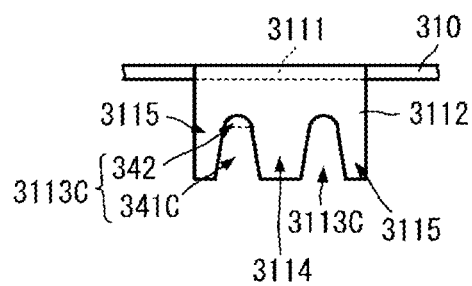
FIG. 12C is a first side view illustrating a connection terminal in accordance with aspects of the present disclosure.
Figure 12D:
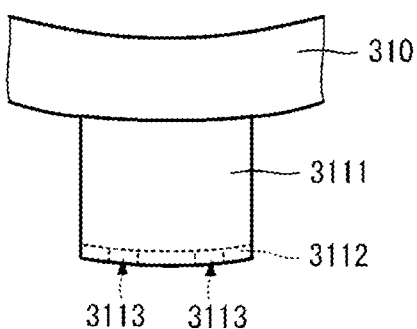
FIG. 12D is a second side view illustrating a connection terminal in accordance with aspects of the present disclosure.
Figure 13A:
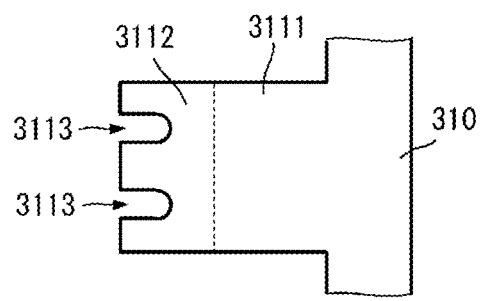
FIG. 13A illustrates a connection terminal in accordance with aspects of the present disclosure.
Figure 13A:
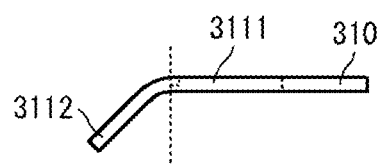
Figure 13B:
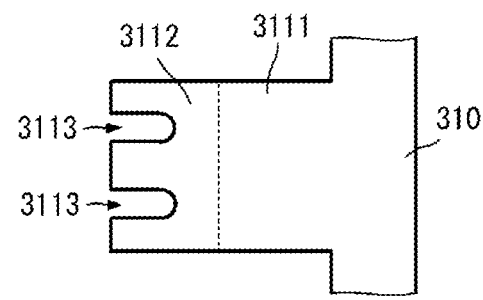
FIG. 13B illustrates a connection terminal in accordance with aspects of the present disclosure.
Figure 13B:
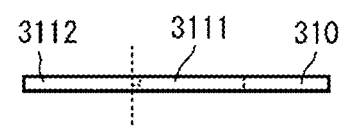
Figure 13C:
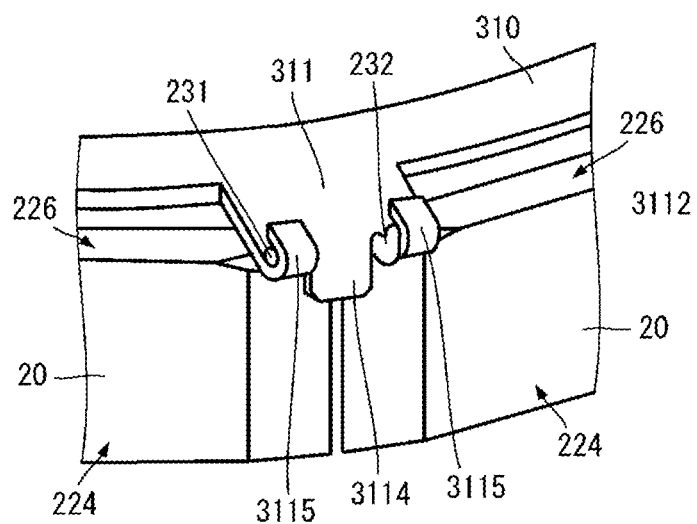
FIG. 13C is a diagram illustrating a connection aspect in the structure of FIG. 13B in accordance with aspects of the present disclosure.
Figure 14:
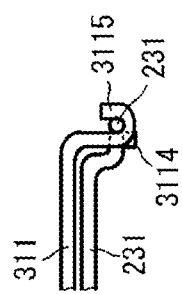
FIG. 14 is a partial side view illustrating a derivative example of a connection in accordance with aspects of the present disclosure.

FIGS. 12A and 12B are perspective views each illustrating an aspect of a connection terminal. FIG. 12C is a first side view illustrating an aspect of a connection terminal. FIG. 12D is a second side view illustrating an aspect of a connection terminal. FIGS. 13A and 13B are two-view drawings each illustrating an aspect of a connection terminal. FIG. 13C is a perspective view illustrating a connection example of the aspect in FIG. 13B. FIG. 14 is a partial side view illustrating a derivative example of the connection aspect in FIG. 13C. In FIG. 12A, FIG. 12B, FIG. 12C, FIG. 12D, FIG. 13A, FIG. 13B, and FIG. 13C, the connection terminal 311 of the busbar 31 is taken as an example and described, and the same may apply to the configurations of the connection terminal 321 of the busbar 32 and the connection terminal 331 of the busbar 33.

Two recesses 3113A may be formed in the second portion 3112 of the connection terminal 311, as illustrated in FIG. 12A. The two recesses 3113A may be different only in depth from the two recesses 3113 described above, and other constituent elements thereof are the same. The depth of the recess 3113A may be smaller than the diameter of the coil end portion 231 and the diameter of the coil end portion 232, and is approximately equal to the radius of the coil end portion 231 and the radius of the coil end portion 232, for example.

Two recesses 3113B may be formed in the second portion 3112 of the connection terminal 311 illustrated in FIG. 12B. The two recesses 3113B may be different from the above-described two recesses 3113 in that a leading end portion thereof is a straight line in plan view, and other constituent elements thereof are the same.

Two recesses 3113C may be formed in the second portion 3112 of the connection terminal 311 illustrated in FIG. 12C. The two recesses 3113C may be different in shape in plan view from the above-described two recesses 3113, and other constituent elements thereof are the same.

The recess 3113C may include a main portion 341C and a leading end portion 342. In the main portion 341C, the width of the end portion (the end portion on the opposite side to the side connecting to the first portion 3111 in the second portion 3112) on the side opened to the outside may be larger than the width of the end portion on the leading end portion 342 side. In one aspect of the disclosure, when the busbar member 30 is installed in proximity of the plurality of stator members 20, the coil end portion 231 and the coil end portion 232 may easily accommodated in the recess portions 3113C. Thus, workability of assembling the motor 10 is further improved.

In the connection terminal 331 as illustrated in FIG. 12D, the second portion 3112 is curved. For example, in the second portion 3112, the distance to the base portion 310 may be the same at any position in the width direction. With this configuration, when the outer end surface 224 of the outer member 221 of the insulator 22 is curved, the second portion 3112 and the outer end surface 224 may entirely come into contact with each other.

In the connection terminal 311 as illustrated in FIG. 13A, the second portion 3112 is not orthogonal to the first portion 3111. For example, as illustrated in FIG. 13A, an angle formed between a surface on the insulator side of the second portion 3112 and the insulator of the first portion 3111 is an obtuse angle of larger than about 90° and smaller than about 180°.

In the connection terminal 311 as illustrated in FIG. 13B, the second portion 3112 is connected straight to the first portion 3111. In one aspect of the disclosure, the connection terminal 311 does not have a portion that is bent halfway in the lengthwise direction.

In such a configuration, as illustrated in FIG. 13C, the coil end portion 231 and the coil end portion 232 are bent in a direction orthogonal to the main surface of the second portion 3112, and are further bent to extend in the width direction of the second portion 3112. The coil end portion 231 and the coil end portion 232 may be fixed by fusing, soldering, laser welding, or the like, while being covered by the tongue portions 3115. In this case, as illustrated in FIG. 13B, the tongue portion 3114 may be bent in a direction orthogonal to the main surface of the first portion 3111.

Further, with respect to FIG. 13C, the coil end portion 231, the coil end portion 232, and the tongue portions 3115 are bent toward the stator assembly side after the joining thereof, as illustrated in FIG. 14. This shortens the length in the axial direction of the structure including the stator assembly and the busbar member 30.

The structure of the outer member 221 and the outer end surface 224 of the insulator 22 may be as follows.

A surface of the outer end surface 224 of the insulator 22 with which the connection terminal makes contact may be flat. For example, the outer end surface 224 is shaved inward at the adjacent end portions of the adjacent stator members 20. The outer end surface 224 is shaved to also include a portion through which the coil end portion 231 and the coil end portion 232 are drawn. The shaved portions of the adjacent insulators may be flush with each other.

With such a configuration, the shape of the insulator is reduced. Further, at the portion through which the coil end portion 231 and the coil end portion 232 are drawn, the connection terminal and the outer end surface 224 become close to each other in distance or make contact with each other. Therefore, the structure in which the coil end portion 231 and the coil end portion 232 are inserted through the recesses 3113 of the connection terminal may be achieved.

The surface 226 of the insulator 22 is provided with grooves configured to draw the coil end portion 231 and the coil end portion 232 therethrough. An interval between these grooves is substantially the same as the interval between the two recesses 3113 of the connection terminal.

With this configuration, the coil end portion 231 and the coil end portion 232 are extended to the desired locations. Therefore, the structure in which the coil end portion 231 and the coil end portion 232 are inserted through the recesses 3113 of the connection terminal is more easily achieved.

While preferred embodiments of the disclosure have been described above, it is to be understood that variations and modifications will be apparent to those skilled in the art without departing from the scope and spirit of the invention. The scope of the invention, therefore, is to be determined solely by the following claims.

What is claimed is:

1. A transducer for converting between electrical energy and mechanical energy, comprising:
    a first coil and a second coil each comprising a first coil end and a second coil end;
    a first stator member and a second stator member each configured in an annular shape and wound with the first coil and the second coil, respectively; and
    a busbar comprising a base portion configured in an annular shape, and a connection terminal connected to the base portion via a base connection and configured to be connected to the first coil end of the first stator member and the second coil end of the second stator member, wherein
    the first coil end of the first stator member and the second coil end of the second stator member are arranged adjacent to each other in a direction along the annular shape of the base portion of the busbar, and
    the connection terminal comprises a first recess and a second recess configured to receive the first coil end of the first stator member and the second coil end of the second stator member, respectively.

2. The transducer of claim 1, wherein the first recess and the second recess are aligned along a width direction of the connection terminal.

3. The transducer of claim 1, wherein the first recess and the second recess are recessed from an end of the connection terminal and towards the base portion.

4. The transducer of claim 3, wherein a leading end portion of the first recess and a leading end portion of the second recess are each formed in a shape in which a center in a width direction of the first recess and the second recess are deeper than both ends in the width direction of the first recess and the second recess.

5. The transducer of claim 4, wherein
    the first coil end and the second coil end are formed in a linear columnar shape,
    a depth of the first recess is larger in size than a diameter of the first coil end of the first stator member, and a depth of the second recess is larger in size than a diameter of the second coil end of the second stator member.

6. The transducer of claim 5, wherein
the first coil end of the first stator member is bent along a wall of the first recess and along an outer surface of the first stator member, and
the second coil end of the second stator member is bent along a wall of the second recess and along an outer surface of the second stator member.

7. The transducer of claim 6, wherein
the connection terminal further comprises a first tongue portion between a first side end of the connection terminal and the first recess, and a second tongue portion between a second side end of the connection terminal and the second recess,
the first coil end of the first stator member is configured to be partially covered by the first tongue portion, and
the second coil end of the second stator member is configured to be partially covered by the second tongue portion.

8. The transducer of claim 7, wherein the connection terminal further comprises a bent portion bent in a direction towards the first stator member and the second stator member halfway in a lengthwise direction extending from the end of the connection terminal towards to the base portion.

9. The transducer of claim 4, wherein
the connection terminal further comprises a first tongue portion between a first side end of the connection terminal and the first recess, and a second tongue portion between a second side end of the connection terminal and the second recess,
the first coil end of the first stator member is configured to be partially covered by the first tongue portion, and
the second coil end of the second stator member is configured to be partially covered by the second tongue portion.

10. The transducer of claim 9, wherein the connection terminal further comprises a bent portion bent in a direction towards the first stator member and the second stator member halfway in a lengthwise direction extending from the end of the connection terminal towards to the base portion.

11. The transducer of claim 1, wherein
the first coil end and the second coil end are formed in a linear columnar shape,
a depth of the first recess is larger in size than a diameter of the first coil end of the first stator member, and
a depth of the second recess is larger in size than a diameter of the second coil end of the second stator member.

12. The transducer of claim 1, wherein
the first coil end of the first stator member is bent along a wall of the first recess and along an outer surface of the first stator member, and
the second coil end of the second stator member is bent along a wall of the second recess and along an outer surface of the second stator member.

13. The transducer of claim 1, wherein
the connection terminal further comprises a first tongue portion between a first side end of the connection terminal and the first recess, and a second tongue portion between a second side end of the connection terminal and the second recess,
the first coil end of the first stator member is configured to be partially covered by the first tongue portion, and
the second coil end of the second stator member is configured to be partially covered by the second tongue portion.

14. The transducer of claim 2, wherein the first recess and the second recess are rounded in shape.

15. The transducer of claim 2, wherein the first recess and the second recess are rectangular in shape.

* * * * *